US005819124A

United States Patent [19]

Somner et al.

[11] Patent Number: 5,819,124

[45] Date of Patent: Oct. 6, 1998

[54] SECURITY SYSTEM

[75] Inventors: Timothy Laurie Somner, Mayfarm, Piccadilly Lane, Mayfield East Sussex, TN20 6RH, Great Britain; Iain Michael Harvey, Heathfield, Great Britain

[73] Assignee: Timothy Laurie Somner, Mayfield, Great Britain

[21] Appl. No.: 670,421

[22] Filed: Jun. 26, 1996

[51] Int. Cl.[6] ..................... G03B 13/20

[52] U.S. Cl. ..................... 396/263; 396/301; 396/427; 396/429

[58] Field of Search ..................... 396/427, 429, 396/419, 153, 263, 301, 302; 348/155

[56] References Cited

U.S. PATENT DOCUMENTS

| | | | |
|---|---|---|---|
| 3,594,747 | 7/1971 | Cronin . | |
| 4,180,316 | 12/1979 | Della-Calce . | |
| 4,522,146 | 6/1985 | Carlson . | |
| 4,525,047 | 6/1985 | Myers . | |
| 5,155,474 | 10/1992 | Park et al. . | |
| 5,495,288 | 2/1996 | Broady et al. | 348/155 |

FOREIGN PATENT DOCUMENTS

| | | |
|---|---|---|
| 269011 | 4/1927 | United Kingdom . |
| 2 046 456 | 11/1980 | United Kingdom . |
| 2 202 954 | 10/1988 | United Kingdom . |
| 2 208 557 | 4/1989 | United Kingdom . |
| 2 224 358 | 5/1990 | United Kingdom . |
| 2 257 257 | 1/1993 | United Kingdom . |
| 2 271 483 | 4/1994 | United Kingdom . |
| 2 282 231 | 3/1995 | United Kingdom . |
| 2 293 247 | 3/1996 | United Kingdom . |
| WO 93/07233 | 4/1993 | WIPO . |

OTHER PUBLICATIONS

"Sentry Point" brochure distributed after Aug. 1995 in UK.

"Smile for the Camera, Mr. Burglar!", *Practical Farm Ideas*, Spring 1996, p. 38.

"Sentry 'Shoots'" Intruders. *Ventures*, Spring 1996, p. 37.

Advertisement for Still Frame Security Camera System to Deter or Photograph Intruders. Advertisement in *Exchange and Mart*, Aug. or Sep. 1995, p. HL25.

VidiCall System. Advertising brochure of The Teleconnect Group. No publication date available.

*Primary Examiner*—David M. Gray

*Attorney, Agent, or Firm*—Bacon & Thomas

[57] ABSTRACT

A security system includes a camera connected to a motion sensor for detecting motion in the vicinity of the camera, the system having a stand-by state in which the motion sensor is active and a ready state wherein triggering of the motion sensor again causes the camera to capture an image. The image enables a burglar to be identified. Entry deterrent including a source of liquid including a dye, a UV-responsive marker, and an irritant liquid may be included. Chillies pickled in vinegar are a suitable irritant.

10 Claims, 4 Drawing Sheets

SECURITY SYSTEM

TECHNICAL FIELD OF THE INVENTION

The present invention relates to a security system.

BACKGROUND ART

Video surveillance systems are known, and generally provide either a continuously running video camera or a video camera adapted to capture a frame every few seconds. The former system generally requires continuous monitoring by a security guard or the like, and it is this factor which leads to the installation of the latter, which requires large amounts of storage media.

Also very well known are burglar alarms which employ a variety of sensors such as passive infra-red detectors, mechanical switches, pressure pads and the like to trigger various deterrent devices such as bells, flashing lights etc.

STATEMENT OF INVENTION

In its first aspect, the present invention provides a camera comprising a motion sensor for detecting motion in the vicinity of the camera, the camera having a stand-by state in which the motion sensor is active, wherein triggering of the motion sensor causes the camera to capture an image. Thus, film or recording media is only consumed when necessary, allowing the camera to remain in place for long periods of time unattended.

More preferably, the camera has a ready state, and moves from the stand-by state to the ready state when the motion sensor is triggered, and remains in the ready state for a predetermined period, a triggering of the sensor during the ready state being necessary to cause the camera to capture an image. Thus, the likelihood of a false trigger is reduced. Even more preferably, the camera comprises a flash or other light source, for example a halogen lamp. The flash unit can then be charged during the ready state. Since most commercial flash units need at least one second, and sometimes as much as three seconds, to charge up, the provision of a ready state enables a simple camera to be used in the dark.

Suitable motion sensors are passive infra-red systems, microwave or shortwave radio doppler systems, laser beam or simple light source and detector means, mechanical switches, or pressure pads.

Preferably, the camera is of the type which develops a printed positive image immediately, eg a Polaroid. (TM).

The camera can be part of a system including a connection to the telephone network and/or satellite link, which enables the system to send a telephone message to a predetermined telephone number when triggered. In a particularly preferred form of the invention, the system is adapted to send a representation of the captured image via the telephone network. This can be done by providing a facsimile machine connected to the telephone network, and a Polaroid type camera, enabling the system to respond to a trigger by capturing an image, printing this as an instant print, and sending an image of this print to a predetermined facsimile number by automatically feeding it into the facsimile machine. Alternatively, the camera could be connected to a suitably programmed computer, which could capture the image in digital form and send it via a modem along a telephone line or via satellite/GPS system e.g. the Magellan message system.

The aforementioned camera or system can be contained as part of a security system in which case it would be preferred if the triggering of the camera also triggers at least one other deterrent device, such as a sound emitter which may be in the form of a horn, bell or voice message, or blank firing cartridges. The latter are known for use as bird scarers. A voice message could be in the form of a pre-recorded message, or produced ad hoc by a voice chip. Other deterrent devices are possible, such as an emitter of CS gas or the like. Combinations of such additional deterrents are possible, for example a voice warning followed by blank cartridges or other pyrotechnic device.

In its second independent aspect, the present invention provides a security system comprising an intruder detector linked to a control unit, the control unit controlling an entry inhibition means, wherein detection of an intruder by the intruder detector causes the control unit to activate the entry inhibition means. A suitable entry inhibition means is a source of liquid, in which case the control unit will be arranged to initiate flow of the liquid out of at least one nozzle in the vicinity of the intruder detector.

Preferred liquids are either markers or irritants, or both, or combination thereof.

The detector unit can if desired be any of the detector units discussed in relation to the first aspect. Indeed, the same detector unit can be employed if both the first and second aspects are installed at the same property. However, this is not essential and the second aspect of the invention is capable of independent installation.

The liquid can be held in a reservoir communicating with a pump under control of the control unit. Thus, triggering of the pump by the processor unit causes liquid in the reservoir to be pumped toward the nozzle. Alternatively, the control unit can initiate flow from a source of high pressure solvent into a feeder unit where the solvent is mixed with other constituents to form the eventual liquid.

Suitable marker chemicals for use in the liquid are fluorescene 28, a fluorescent brightener, Eosin, or Tinopal. The solvent will then preferably be water. Suitable concentrations of fluorescene 28 are between 1 and 2 grammes per liter of water. Tinopal remains effective at significantly lower concentrations, eg to 0.1 g per liter of water.

A suitable irritant can be produced by pickling chillies in vinegar. This leaves an irritant liquid which generally does not block nozzles through which it is sprayed.

A saline solution could also be included in the liquid, to prevent the system from icing during cold periods. Of course, other antifreezes could also be used.

Preferably, there is more than one nozzle. The nozzles will ideally be distributed about likely locations for an intruder, for example under windows, either side of doors etc.

The control unit can be a simple relay, or can incorporate a microprocessor.

DESCRIPTION OF DRAWINGS

Embodiments of the present invention will now be described by way of example, with reference to the accompanying Figures, in which.

DETAILED DESCRIPTION OF EMBODIMENTS

Figure 1:
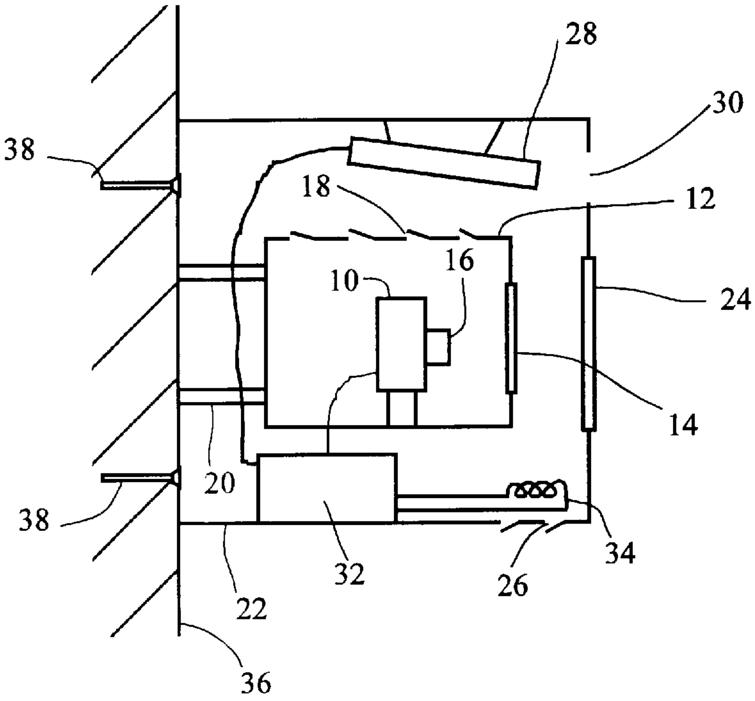
FIG. 1 is a cross-sectional view of a first embodiment of the first aspect of the present invention.

Referring to the embodiment of FIG. 1, this shown a camera 10 which has auto-wind and auto-exposure capabilities. Such a camera is commercially available. This is enclosed within a first enclosure 12 which has a transparent window 14 in front of the lens 16 of the camera 10. Vents 18 are provided on a surface of the first enclosure 12, to prevent condensation forming on the window 14.

The first enclosure 12 is attached via supports 20 to an internal wall of a second enclosure 22. The second enclosure 22 has a transparent window 24 corresponding to the window 14 of the first enclosure. Thus, the lens 16 of the camera 10 has a clear view out of both enclosures. The second enclosure 22 also has vents 26 on a surface thereof, to allow air circulation and inhibit misting of both windows. In the case of the second enclosure 22, the vents 26 are provided on a lower surface, to prevent ingress of rain, etc.

Also within the second enclosure 22 is a motion sensor 28, in this case suspended from an upper internal face of the second enclosure 22. An opening 30 is formed in a surface of the second enclosure 22 in front of the motion sensor 28, to allow the motion sensor 28 to view the region in front of the second enclosure 22.

Both the camera 10 and the motion sensor 28 are connected to a control unit 32. This control unit includes a battery to power the motion sensor and also a trigger to activate the camera in dependence on signals received from the motion sensor 28. In this embodiment, the control unit 32 also has a temperature sensor and is adapted to activate heating coils 34 if the temperature in the vicinity of the camera falls below 40° F., a temperature below which many photographic materials cease to function satisfactorily.

The second enclosure is attached to a wall 36 by bolts 38. Thus, it can be placed in a suitable position to view a desired area.

The motion sensor can be any of a passive infra-red sensor, an ultra-violet sensor, a microwave doppler sensor, short wave radio doppler sensor, or radar sensor. In addition, the motion detector 28 as illustrated can be omitted in favour of a signal received from a laser light/detector system or mechanical switches, or pressure pads installed in a region in which movement is to be sensed. Such arrangements are considered, in the present context, to constitute motion sensors, in that the motion of a detected object or person is necessary to trigger them.

An indoor display of signals from the or each motion sensor could also be provided, to give a householder warning of outside activity.

Suitably, the first and second enclosures are constructed of a environment-resistant, sturdy material. Mild steel or stainless steel are preferred. This can be galvanised or painted if desired. Alternatively, non-metallic materials such as glass reinforced plastic, ABS plastic or wood can be used.

The control unit 32 is, in this embodiment, arranged to move from a passive state to a ready state on receipt of a first signal from the movement detector. In the ready state, a flash unit attached to the camera is activated, if desired, and if a second signal is received from the motion detector whilst a control is in this ready state, then the camera is instructed and a photograph is taken. The camera sets the exposure automatically, and winds on the film after the exposure automatically. If no signal is received from the movement sensor for a predetermined period of time, e.g. ten seconds, then the control unit returns to the stand-by state.

Figure 2:
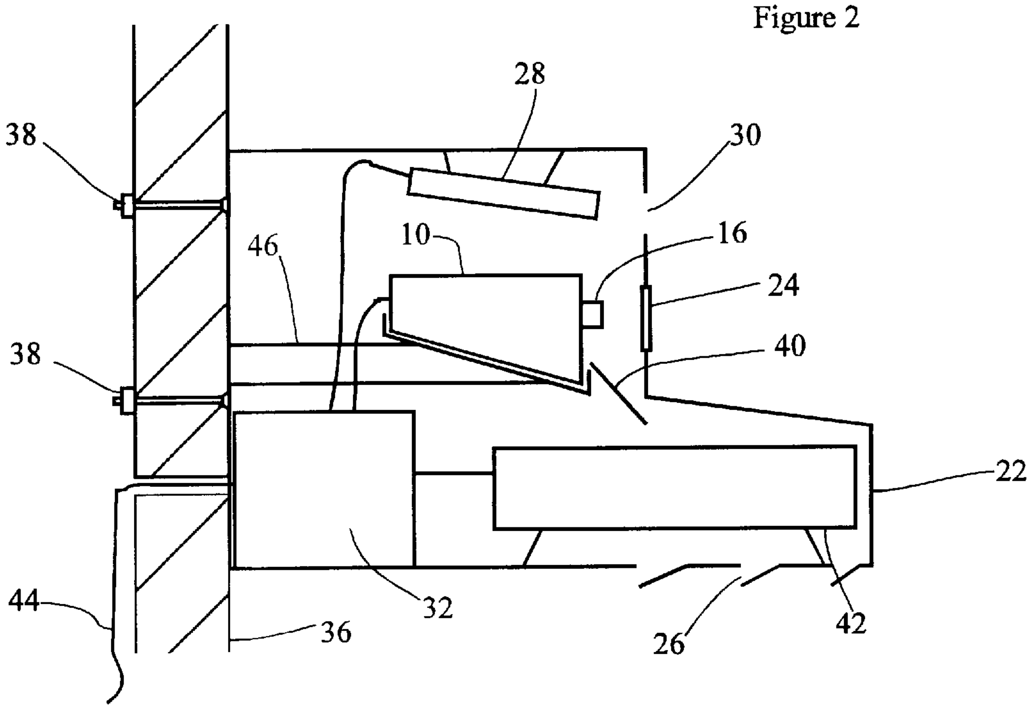
FIG. 2 is a cross-sectional view of a second embodiment of the first aspect of the present invention.
Figure 3:
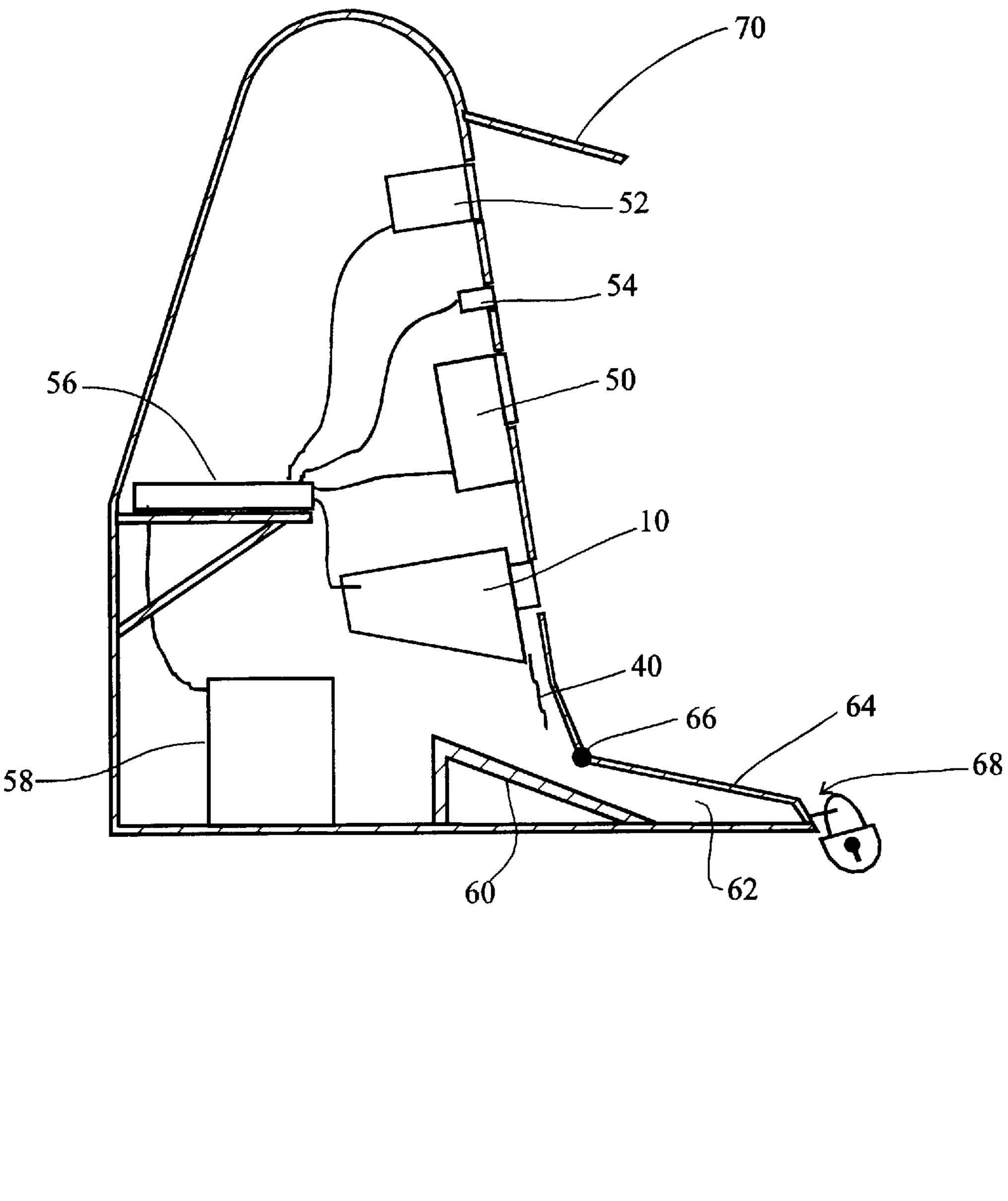
FIG. 3 is a cross-sectional view of a third embodiment of the first aspect of the present invention.

FIG. 2 shows an alternative embodiment of the present invention. In FIG. 2, the same reference numerals are used to denote identical or equivalent parts.

In this embodiment, the camera 10 is a Polaroid (TM) camera, and after taking an exposure expels a finished print 40. The print 40 is then dropped to collection point 42. Collection point 42 may be a simple box, which will be emptied after use, or in this embodiment it can be a fax machine. In this case, the control unit 32 activates the fax machine 42, after a suitable delay to allow developing of the print 40, and hence a facsimile of the print 40 is transmitted via telephone line 44 to a predetermined telephone number or numbers.

In this embodiment, the inner enclosure 12 is omitted, and instead the camera 10 is supported on a table 46.

An alternative to the facsimile machine 42 of FIG. 2 is for the camera 10 to be connected to a suitably programmed computer, arranged to capture an image from the camera 10 in digital form and send it via telephone line 44 or satellite link.

It is possible for the above-described embodiments to be part of a larger security system, in which the triggering of the camera 10 could be linked to other deterrent devices, such as a telephone message to a remote number, a voice chip or other audible warning such as alarm bell, a strong flashlight when the picture is taken, or other deterrent means such as release of CS gas, a pepper spray, holographic or other projection unit etc. In this case, it would be desirable to protect the enclosure 22, and this could be by installing an anti-tremor movement unit in the box, or applying a high voltage electric charge to the box, if conductive.

Figure 4:
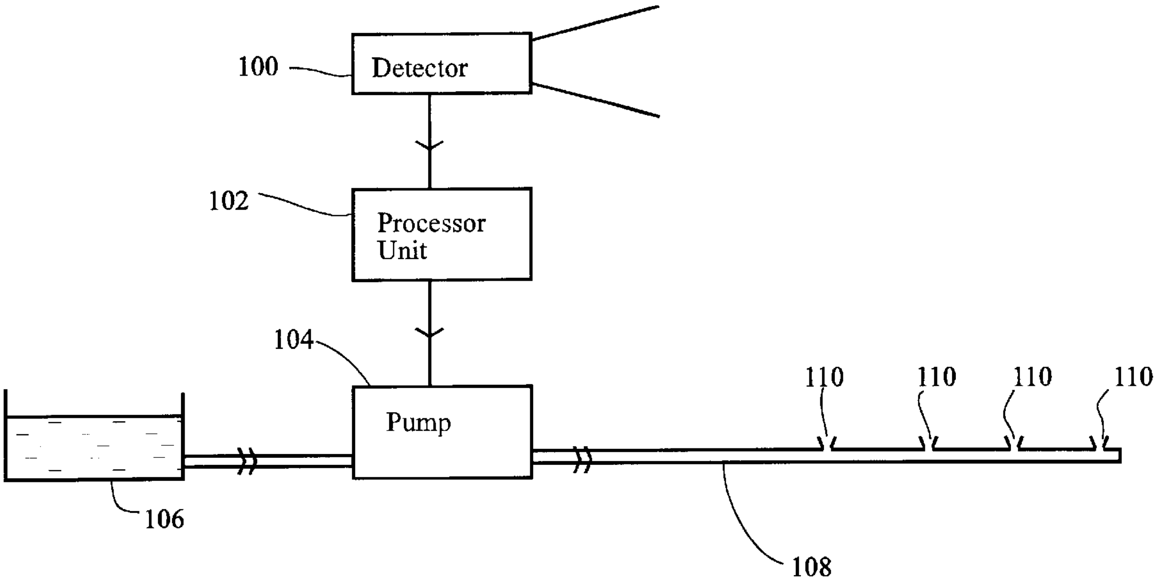
FIG. 4 is a schematic view of a first embodiment of the second aspect of the present invention.

A third embodiment shown in FIG. 4 employs a Polaroid camera 10 with a separate flash unit 50. It also has a long-range motion sensor 52, for example a PIR unit, and a shorter-range motion sensor 54. A control unit 56 is powered by a battery pack 58, and is normally in standby mode until long-range motion sensor 52 detects the approach of a subject, whereupon the control unit moves into a ready state. Whilst in the ready state, triggering of the shorter-range motion sensor 54 causes a photograph to be taken. During the ready state, the flash unit 50 is charged, ready for use.

Photographs 40 produced by the Polaroid camera 10 are directed by ramp 60 into collection point 62. A lid 64 of the collection point 62 is openable at hinge 66 to gain access to the photographs. Preferably, the lid comprises a hasp 68 at which can be affixed a suitable lock.

A shade 70 is provided to reduce the possibility of false positive signals caused, for example, by sunlight.

An alternative to the flash 50 is a light source, for example a halogen lamp. The present inventor has found that a 500 W halogen lamp provides sufficient light of acceptable intensity for photography. Such lamps are commercially available. The light could be permanently illuminated whilst the unit is switched on, or only when the sensor is in the ready state.

All the above embodiments are intended to be powered by mains electric power from within the building. It will then be possible to switch the units on from within the building. Known remote control devices, eg those operating by IR signals could also be used to provide remote switching.

Referring to FIG. 4, this shows a version of the second aspect of the present invention. A detector unit 100 is adapted to detect motion of intruders toward the protected building. If it senses movement, a trigger signal is sent to it processor unit 102, which activates a pump 104 for a predetermined time. This may be achieved by the detectors trigger signal activating a monostable unit which triggers a relay, which then supplies power to the pump. The pump unit then pumps liquid from a reservoir 106 into piping 108 where it is sprayed at nozzles 110. The nozzles 110 will be situated so that they are in the vicinity of the detector 100 or are near where the intruder is likely to be.

The reservoir 106 contains a solution of the fluorescene brightener 28. This is known as a brightener in washing powder. Under UV light this dye glows, and therefore the police or others can detect the presence of the liquid by simple tests. UV light sources are easily available. The liquid can be made unique to the particular property by addition of a chemical fingerprint, for example bromide. Suitable concentrations of the fluorescene in water would be between 1 and 2 grammes per liter, although concentrations outside of this range will work satisfactorily. Fluorescene 28 is believed to be non-toxic in low concentrations.

Figure 5:
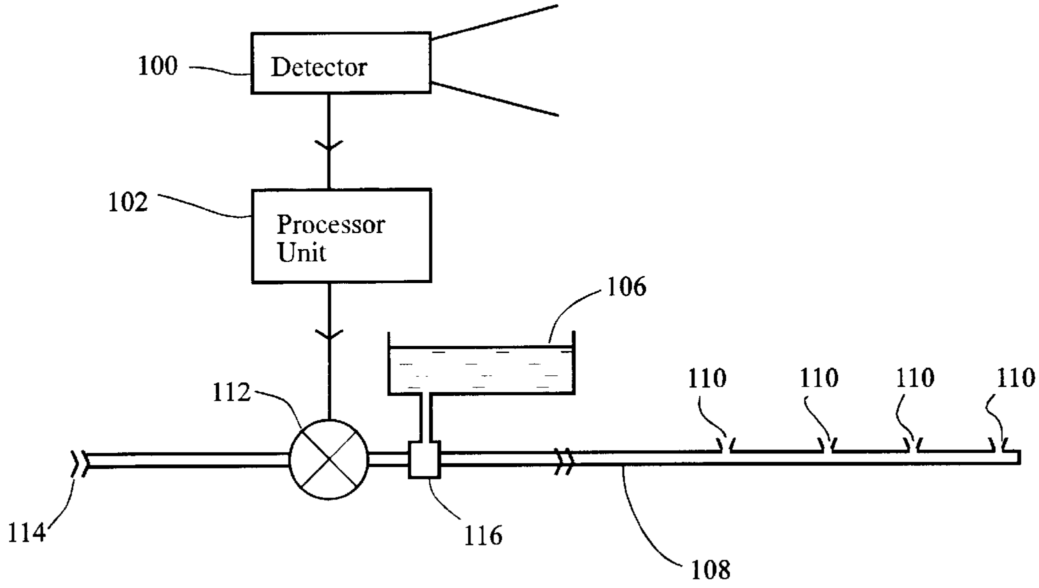
FIG. 5 is a schematic diagram of a second embodiment of the second aspect of the present invention.

FIG. 5 shows an alternative version of the second aspect, in which the detector 100 again triggers the processor unit 102, but the processor 102 then opens an electronically controlled valve 112 for a predetermined time. This valve is connected to a supply of water 114 at mains pressure, which then passes to a feeder unit 16 which mixes the mains pressure water with a neat or concentrated solution of dye from the reservoir 106. This mains pressure water is sufficient to propel the liquid along the piping 108 and out of the nozzles 110 without the need for a separate pump.

Figure 6:
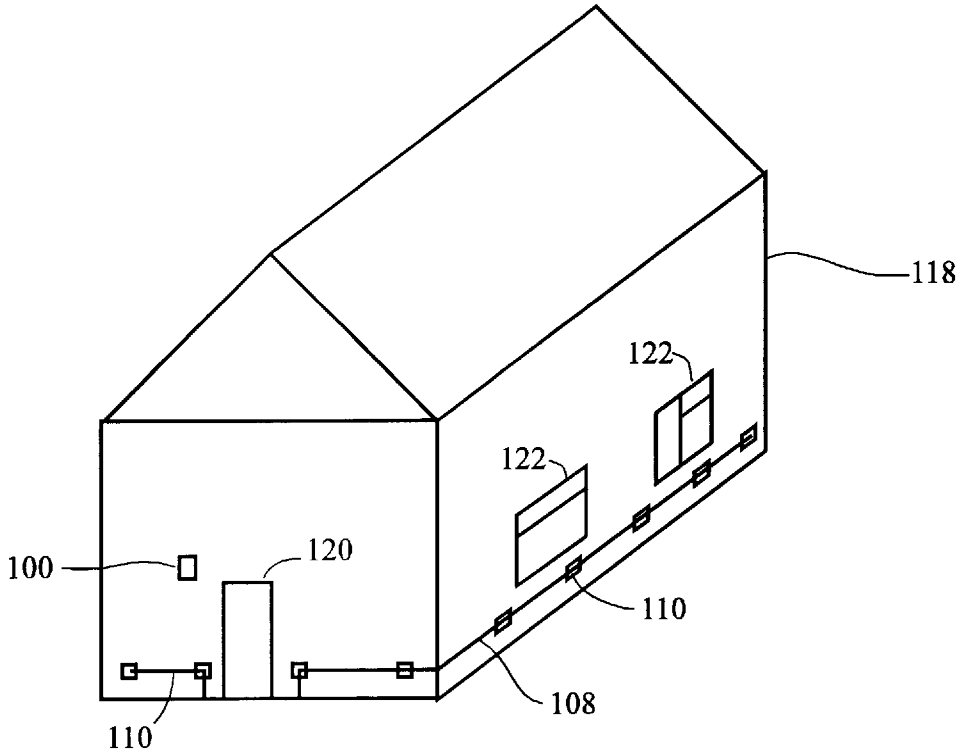
FIG. 6 is an isometric view of a building protected by the second aspect of the present invention.

FIG. 6 shows diagrammatically the system installed. A property 118 can be protected as a detector 100 over a door 120. Thus, the detector 100 can detect intruders heading along the main access path toward the property 118. Within the building 118 are the processor unit 102, reservoir 106 etc. Attached to the outside walls of the building and at approximately 2 feet from the ground are lengths of piping 108 with nozzles 110 at approximately 6 foot intervals. Care has been taken to ensure that nozzles 110 are near to doors 120 and windows 122, likely points for an intruder.

It is intended that the liquid sprayed be non-toxic, although this is, not essential. On this basis, the advantage of this aspect of the invention is that forensic tests can be carried out by the police to identify the intruder, once a suspect or suspects have been identified. To an extent, the concentration of fluorescene can act as a fingerprint, but it is preferred to add other chemicals, unique to that property, for example bromide.

Other potential marker chemicals are Tinopal, available from Ciba-Geigy, and Eosin, available from Colne Valley Dye & Chemical Company Ltd, Huddersfield, GB, and the British Anilyne Dye & Chemical Works Ltd (W.S. Simpson & Co), London, GB.

Also, it is possible to obtain spray nozzles 110 that provide one of a variety of spray patterns. Thus, if a property was fitted with particular patterned nozzles, then the physical arrangement of the dye on an intruder's clothes could link the intruder to a particular property.

If no spray pattern is to be formed, then nozzles 110 which form a mist of liquid are preferred, since the mist is likely to hang in the atmosphere for a significant length of time. Thus, even if the intruder is not hit directly by a spray, it will be difficult for him or her to leave the property without acquiring some dye. The mist will ideally be about 4 feet high, since the likelihood of catching the intruder is clearly increased with increasing depth of mist, but 4 feet is not so high as to reach the eyes of the intruder and potentially cause harm.

The liquid could also include saline or other non-toxic antifreeze. This would additionally keep areas around the protected property free of ice and snow, etc.

An alternative liquid is an irritant. The invention is not particularly limited as to the irritant, but it should be stable, in particular not liable to precipitate or drop out of a pre-existing suspension, not liable to decomposition or biodeterioration, and be non-toxic in the sense that it is not known to cause permanent or pathological conditions. A suitable liquid can be prepared by soaking chilli peppers in pickling vinegar.

It is unlikely that the fluoroscene and irritant could be combined. To overcome this, two parallel fluid delivery systems might be provided, one delivering a marker solution and one delivering an irritant. The marker solution might be sprayed at low level to mark an intruder's clothes, whilst the irritant could be sprayed higher up, to reach an intruder's eyes.

Alternatively, solid means for inhibiting entry could be employed. For example, the control unit could fire explosive bolts to release drop gates. In domestic circumstances, servomechanical units could close gates, or operate curtains and windows.

It will be appreciated that the above-described embodiments are described by way of example, and modifications will be apparent to the skilled person. Such modifications may be made without departing from the scope of the present invention. In particular, the camera of the first aspect of the present invention finds applicability in fields other than security. For example, it can be left unattended in places where wildlife is likely to arrive, to photograph that wildlife.

What is claimed is:

1. A camera system comprising:

a camera for capturing an image, the camera having means for placing the camera in a stand-by state in which the camera is not ready for capturing an image and a ready state in which the camera is ready for capturing an image;

a motion sensor for detecting motion in the vicinity of the camera, said motion sensor being active at least when the camera is in its stand-by state;

means to actuate the camera from a stand-by state to a ready state upon the motion sensor detecting a first occurrence of motion;

means to maintain the camera in the ready state for a predetermined period and then to return the camera to a stand-by state if the motion sensor does not sense another occurrence of motion within such predetermined period; and means to actuate the camera to capture an image in the event that the motion sensor detects another occurrence of motion during said predetermined period while the camera is in the ready state.

2. A camera system according to claim 1, wherein the motion sensor is selected from the group consisting of a passive infra-red system, microwave or shortwave radio Doppler system, laser beam or simple light source, detector means, mechanical switch and a pressure pad.

3. A security system including a camera system according to claim 1, a connection to a telephone network and/or satellite link, and means for sending a telephone message to a predetermined telephone number when the camera is actuated to capture an image.

4. A system according to claim 3, including means for transmitting a representation of the captured image via the telephone network.

5. A security system including a camera according to claim 1, including at least one intruder entry deterrent device, and means for actuating said at least one intruder entry deterrent device when the camera is actuated to capture an image.

6. A security system according to claim 5, wherein the entry deterrent device is a sound emitter selected from the group consisting of a horn, bell, voice message, blank firing cartridges and a combination of said horn, bell, voice message and blank firing cartridges.

7. A security system according to claim 5, wherein the entry deterrent device is a source of liquid and a means for ejecting the liquid.

8. A security system according to claim 7, wherein the liquid is selected from the group consisting of a marker, an irritant, and a combination of a marker and an irritant.

9. A security system according to claim 8, wherein the liquid consists of a marker containing at least one of a fluorescent 28, a fluorescent brightener, Eosin, and Tinopal.

10. A security system according to claim 9, wherein the liquid consists of an irritant comprising chillies pickled in vinegar.

* * * * *